(12) United States Patent
Naslain

(10) Patent No.: US 10,293,843 B2
(45) Date of Patent: May 21, 2019

(54) JUVENILE STROLLER

(71) Applicant: Dorel Juvenile Group, Inc., Foxboro, MA (US)

(72) Inventor: Yann Naslain, Cholet (FR)

(73) Assignee: Dorel Juvenile Group, Inc, Foxboro, MA (US)

( * ) Notice: Subject to any disclaimer, the term of this patent is extended or adjusted under 35 U.S.C. 154(b) by 0 days.

(21) Appl. No.: 15/895,424

(22) Filed: Feb. 13, 2018

(65) Prior Publication Data

US 2018/0229750 A1 Aug. 16, 2018

(30) Foreign Application Priority Data

Feb. 14, 2017 (FR) .................................... 17 51201
Jun. 9, 2017 (FR) .................................... 17 55199

(51) Int. Cl.
| | |
|---|---|
| *B62B 7/12* | (2006.01) |
| *B62B 7/00* | (2006.01) |
| *B62B 9/20* | (2006.01) |
| *B62B 9/28* | (2006.01) |
| *B62B 9/12* | (2006.01) |
| *B62B 5/08* | (2006.01) |
| *B62B 9/10* | (2006.01) |

(52) U.S. Cl.
CPC .............. *B62B 7/008* (2013.01); *B62B 5/082* (2013.01); *B62B 7/123* (2013.01); *B62B 9/104* (2013.01); *B62B 9/12* (2013.01); *B62B 9/20* (2013.01); *B62B 9/28* (2013.01)

(58) Field of Classification Search
CPC ......... B62B 5/082; B62B 9/104; B62B 7/123; B62B 9/28; B62B 9/12; B62B 9/20; B62B 7/008
See application file for complete search history.

(56) References Cited

U.S. PATENT DOCUMENTS

| | | | | |
|---|---|---|---|---|
| 3,998,490 | A * | 12/1976 | Lallave ................. | A47D 13/025 297/243 |
| 6,045,145 | A * | 4/2000 | Lan ........................... | B62B 9/28 280/47.35 |
| 6,086,087 | A * | 7/2000 | Yang ......................... | B62B 7/06 280/47.41 |
| 6,209,892 | B1 * | 4/2001 | Schaaf .................... | B62B 7/145 280/33.993 |
| 8,641,077 | B2 * | 2/2014 | Conrad ................... | B62B 7/008 280/47.38 |
| 9,849,903 | B1 * | 12/2017 | Lai ........................... | B62B 9/12 |

(Continued)

FOREIGN PATENT DOCUMENTS

| | | |
|---|---|---|
| CN | 2381555 Y | 6/2000 |
| CN | 101850781 B | 10/2010 |

(Continued)

OTHER PUBLICATIONS

French Search Report for French App. No. 1751201, dated Oct. 30, 2017, DF-140 FR, including English translation, 12 pages.

*Primary Examiner* — Erez Gurari
(74) *Attorney, Agent, or Firm* — Barnes & Thornburg LLP

(57) ABSTRACT

A stroller includes a chassis and a child support. The chassis is configured to roll along the ground in response to being pushed by a caregiver. The child support is coupled selectively to the chassis and is configured to support a child resting therein.

19 Claims, 13 Drawing Sheets

(56) References Cited

U.S. PATENT DOCUMENTS

| | | | | |
|---|---|---|---|---|
| 2008/0088115 A1* | 4/2008 | Yang | B62B 9/28 | 280/642 |
| 2010/0013281 A1* | 1/2010 | Chen | B62B 7/14 | 297/243 |
| 2010/0072732 A1* | 3/2010 | Offord | B62B 7/14 | 280/647 |
| 2010/0078916 A1* | 4/2010 | Chen | B60N 2/2848 | 280/648 |
| 2010/0140902 A1* | 6/2010 | Zehfuss | B62B 7/008 | 280/650 |
| 2010/0201103 A1* | 8/2010 | Kretschmer | B62B 7/123 | 280/642 |
| 2011/0175330 A1* | 7/2011 | Smith | B62B 7/008 | 280/649 |
| 2011/0181024 A1 | 7/2011 | Chicca | | |
| 2012/0261906 A1 | 10/2012 | Chicca | | |
| 2013/0106078 A1* | 5/2013 | Li | B62B 7/008 | 280/650 |
| 2013/0140797 A1* | 6/2013 | Fritz | B62B 7/08 | 280/649 |
| 2013/0207369 A1* | 8/2013 | Pollack | B62B 9/12 | 280/650 |
| 2014/0191483 A1* | 7/2014 | Rolicki | B62B 7/04 | 280/47.41 |
| 2014/0217706 A1 | 8/2014 | Chicca | | |
| 2015/0232114 A1* | 8/2015 | Gillett | B62B 7/12 | 280/30 |
| 2016/0001805 A1* | 1/2016 | Pacella | B62B 7/145 | 280/47.38 |
| 2016/0339940 A1* | 11/2016 | Lee | B62B 9/102 | |
| 2017/0217471 A1* | 8/2017 | Haut | B62B 7/008 | |
| 2018/0043919 A1* | 2/2018 | Lee | B62B 5/004 | |
| 2018/0229750 A1* | 8/2018 | Naslain | B62B 7/008 | |

FOREIGN PATENT DOCUMENTS

| | | |
|---|---|---|
| GB | 2193692 A | 2/1988 |
| WO | 2009039537 A2 | 3/2009 |

* cited by examiner

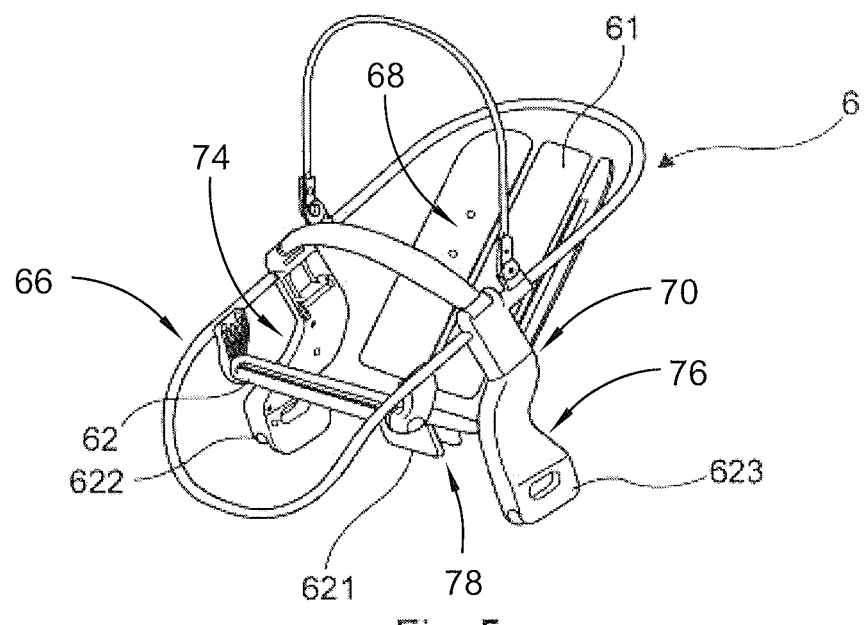

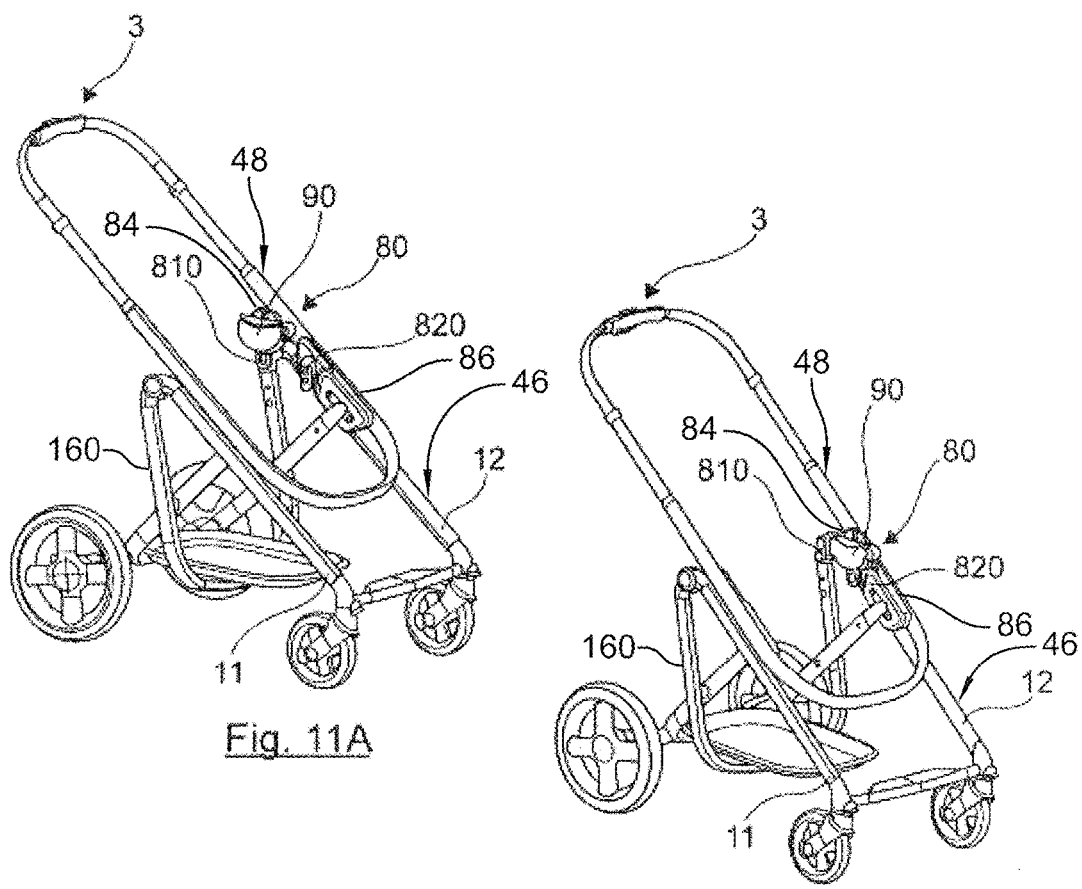
Fig. 11A
Fig. 11B
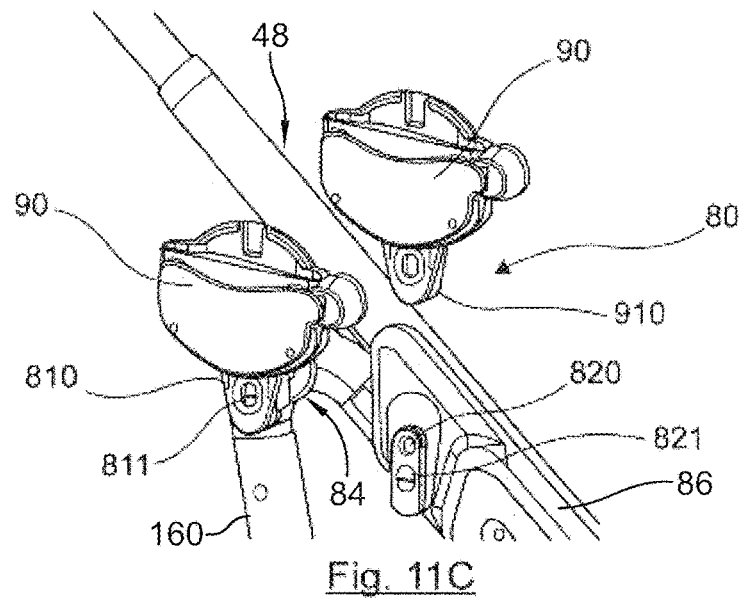
Fig. 11C

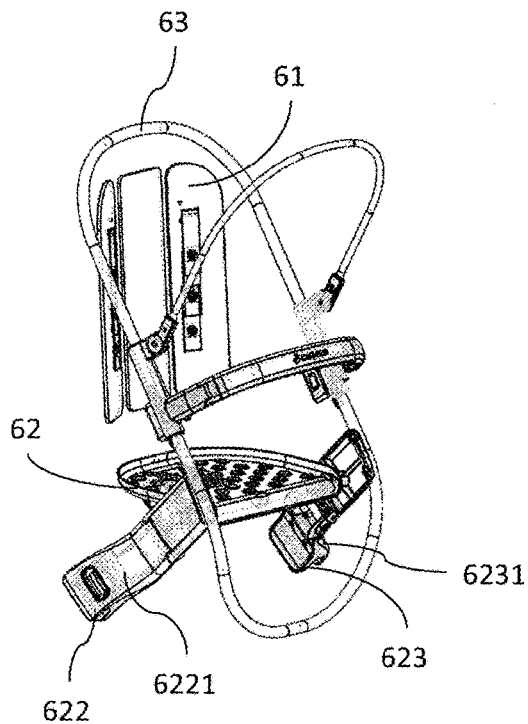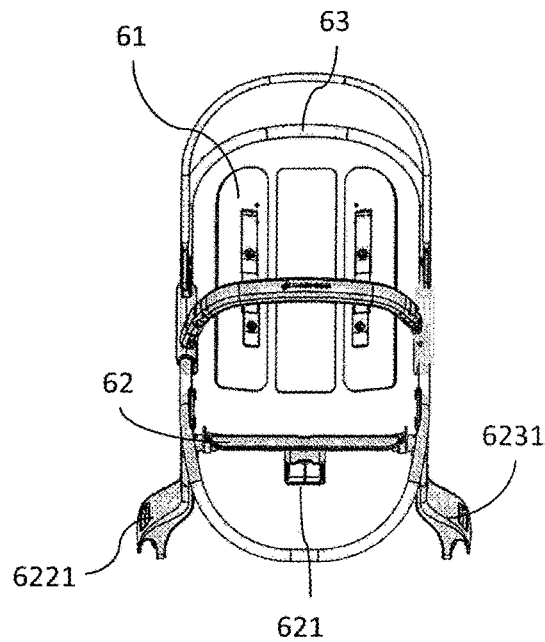
Fig. 13A	Fig. 13B
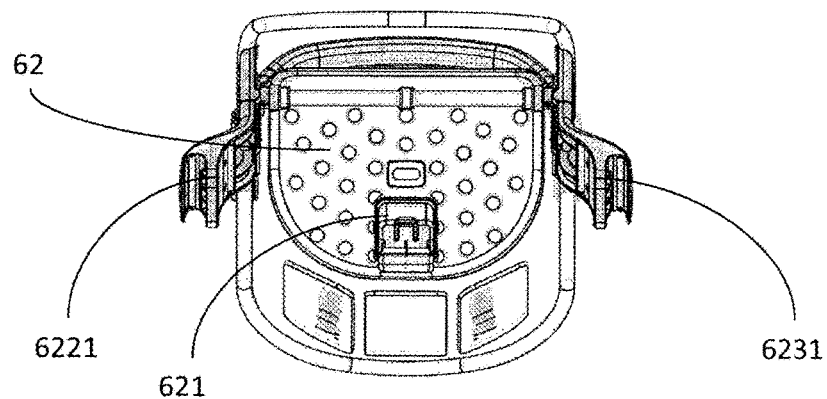
Fig. 13C

JUVENILE STROLLER

PRIORITY CLAIM

This application claims priority to French Application No. FR1751201, filed Feb. 14, 2017, and French Application No. FR1755199, filed Jun. 9, 2017, each of which is expressly incorporated by reference herein.

BACKGROUND

The present disclosure relates to strollers for juveniles, and particularly to collapsible strollers for juveniles. More particularly, the present disclosure relates to collapsible strollers having more than one seat.

SUMMARY

According to the present disclosure, a stroller includes a chassis and a child support. The chassis is configured to roll along the ground in response to being pushed by a caregiver. The child support is coupled selectively to the chassis and is configured to support a child resting therein.

In illustrative embodiments, the stroller further includes a second child support coupled selectively to the chassis. The second child support is located at a front portion of the chassis so as to locate the main child support between the second child support and a handlebar included in the chassis.

In illustrative embodiments, the second child support is coupled to the chassis at three points. Each point is spaced apart from the other point to provide for stable mounting of the second child support to the chassis Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view showing a booster seat coupled to at a front of a chassis included in the stroller;

FIG. 2 is a bottom perspective view of the booster seat of FIG. 1 showing that the booster seat includes means for coupling the booster seat to the chassis;

FIG. 3 is a diagrammatic view showing one method of implementing the booster seat on the chassis using crossbars included in the chassis;

FIGS. 4-10 are a series of views showing a second embodiment of a stroller in accordance with the present disclosure;

FIG. 4 is a side elevation view of a stroller showing the booster seat installed at a front of a chassis included in the stroller;

FIG. 5 is a perspective view of the booster seat of FIG. 4;

FIG. 7 is a view similar to FIG. 4 showing the chassis equipped with the booster seat and a pair of rear elements for attaching the first seat;

FIG. 8 is a view similar to FIG. 7 showing the first seat arranged in an upright position coupled to the chassis and arranged to face toward the caregiver:

FIG. 9 is a view similar to FIG. 8 showing the first seat arranged in a laying down or bassinet arrangement facing toward the caregiver;

FIG. 10 is a view similar to FIGS. 8 and 9 showing the first seat arranged in the upright position coupled to the chassis and arranged to face away from the caregiver;

FIG. 11A is partial perspective view of a stroller in accordance with the present disclosure showing rear means for coupling a first seat in a first arrangement to a chassis of the stroller;

FIG. 11B is a view similar to FIG. 11A showing the rear means for coupling the first seat in a second arrangement to the chassis;

FIG. 11C is an enlarged view of a portion of FIGS. 11A and 11B suggesting how the rear means for coupling may be varied to accommodate the two arrangements of the first seat on the chassis;

FIG. 13A is a perspective view of the booster seat of FIG. 4;

FIG. 13B is a front elevation view of the booster seat of FIG. 13A;

FIG. 13C is a bottom plan view of the booster seat of FIGS. 13A and 13B;

DETAILED DESCRIPTION

Figure 1:
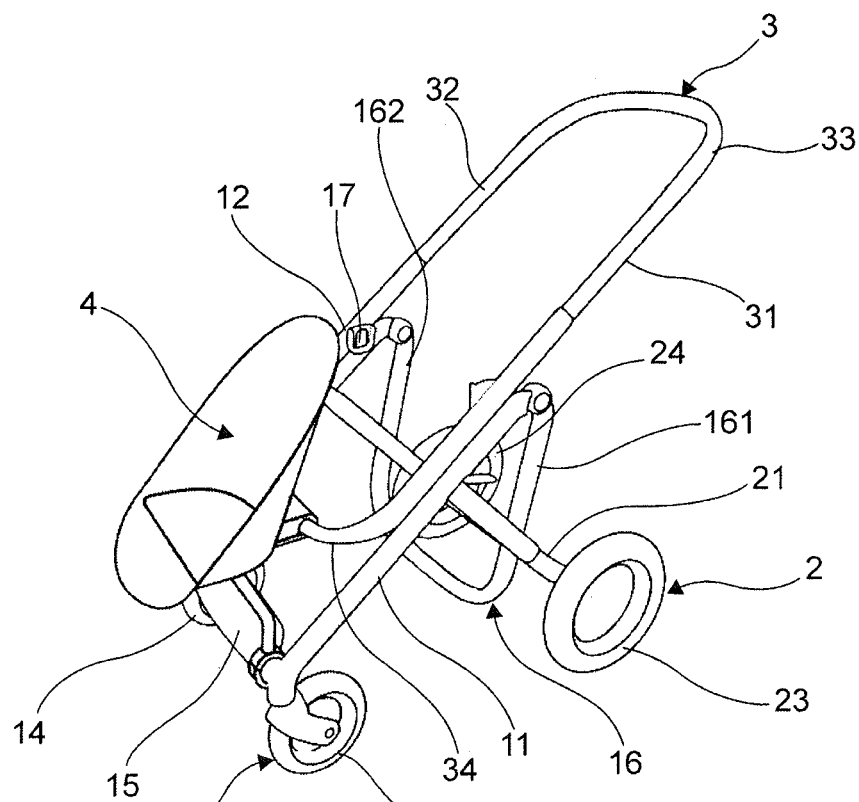
FIGS. 1-3 are a series of views showing a first embodiment of a stroller in accordance with the present disclosure.

A stroller in accordance with the present disclosure may be used with a single seat, a booster seat, or both. A booster seat may be installed on a chassis as shown in FIG. 1. The chassis comprises, in addition to a possible crossbar extending near front wheels (here called the second crossbar), as described in particular in the first embodiment defined below, at least one other crossbar (here called the first crossbar), whereon at least one part of a seat connecting means comes to be attached. Another part of the seat connecting means can be attached on a lower part of the chassis, in other words, downstream of the first crossbar.

The stroller for children comprises a chassis that has two front lateral uprights and two rear lateral uprights, each one carrying a wheel, or a wheel unit. Handles, or a handlebar, are coupled at the end of push-pieces. These push-pieces are arranged so they can slide in relation to the front uprights. The stroller also comprises a main seat (or a carrycot or a shell) at the front of which a booster seat may be coupled so as to transport a second child. The booster seat may be connected directly to the chassis of the stroller without it being necessary to add intermediary connecting elements between the chassis and the seat.

For this, the booster seat comprises connecting means, the specific forms of which enable, they themselves, the connection to the chassis of the stroller, and more specifically, to elements belonging to a front part of the chassis. The booster may be mounted to the chassis without any additional connecting elements. Thus, when the booster seat is removed from the stroller, the stroller may be used without any risk from elements which would protrude from the chassis for the booster seat. Furthermore, installation and the removal of the booster seat may be simple and effective.

Figure 2:
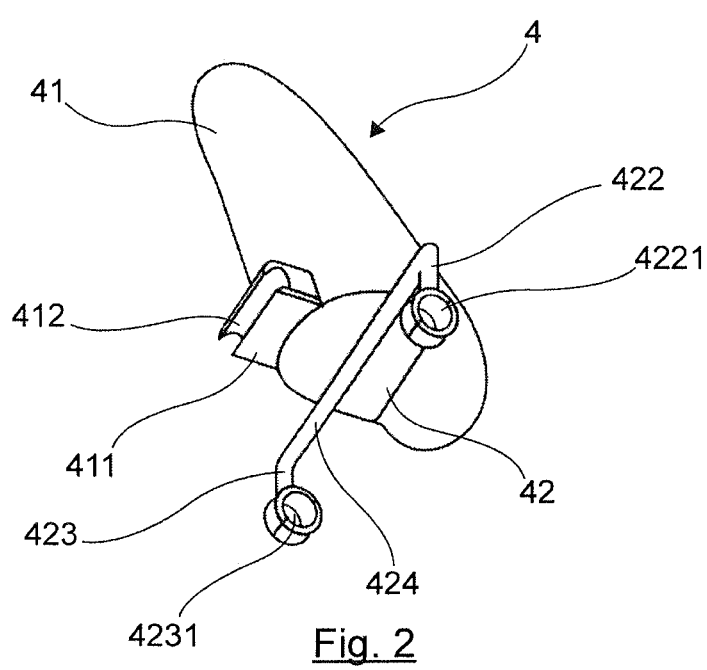
Figure 3:
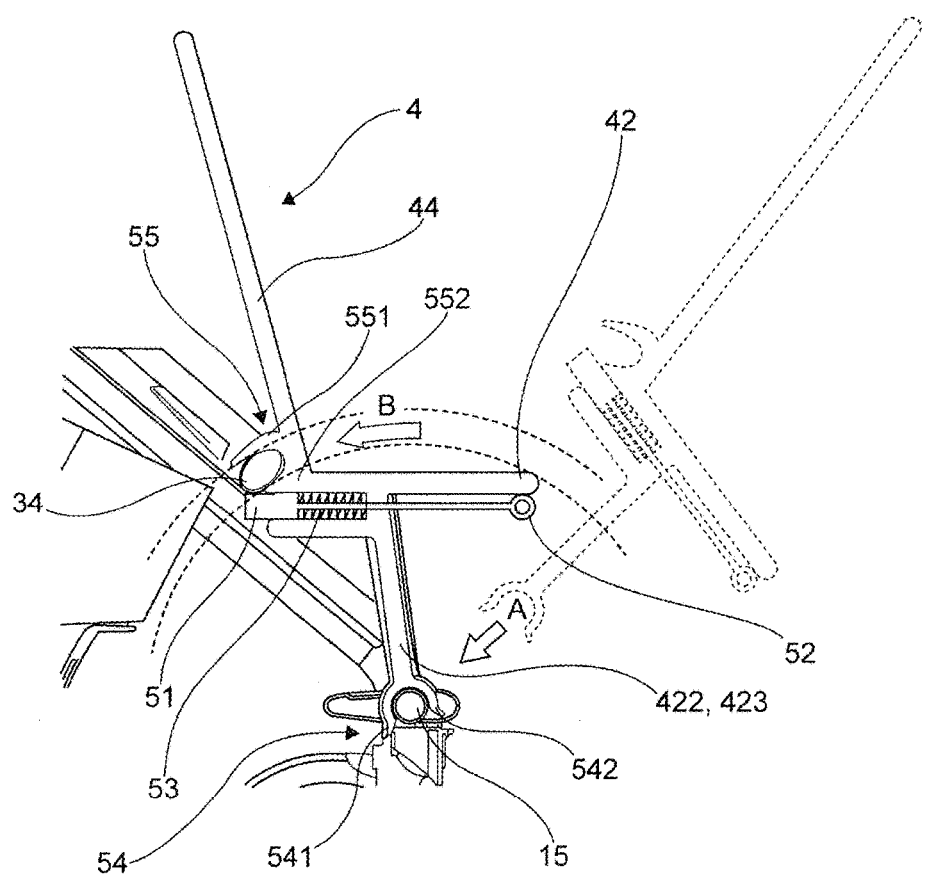

A first embodiment of a stroller in accordance with the present disclosure is shown in FIGS. 1-3. The booster seat is coupled to a chassis of the stroller at three contact points using two lateral crossbars of the chassis as shown in FIG. 1.

A first contact point is created between the seat and a first crossbar extending between push-piece arms of the stroller. Two other contact points are created between the seat and a second crossbar, located under the first crossbar, and extending near the front wheels.

A stroller made of a chassis comprising three separate sub-assemblies 1, 2, 3 is shown in FIG. 1. A first front sub-assembly 1 comprises two front uprights 11, 12 supporting two front wheels 13, 14 and connected to each other by a crossbar 15 (called second crossbar) located near the wheels 13, 14. This second crossbar being able to form a footrest in this embodiment. A stroller in accordance with the present disclosure may also be applied to strollers comprising a crossbar 15 positioned substantially higher in relation to the wheels, in other words, farther away from the ground, between the front uprights 11, 12.

This first sub-assembly 1 also comprises a general U-shaped element 16 made of two uprights 161, 162 articulated on the one hand, in their lower part, in relation to the upper part of the front uprights 11, 12 and on the other hand, lower, to the front uprights 21, 22 of a second rear sub-assembly 2.

This second rear sub-assembly 2 therefore comprises two rear uprights 21, 22 carried by two rear wheels 23, 24 and each articulated at two points, on the one hand, in the lower part in relation to the uprights 161, 162 of the first front sub-assembly 1, and on the other hand, in the upper part in relation to a third handle sub-assembly 3.

The third handle sub-assembly 3 comprises an annular frame comprising a handlebar 33 enabling to move and guide the stroller and connected to two lateral uprights (or push-piece arms) 31, 32 and a lower crossbar 34, called first crossbar in the lower part.

This third handle sub-assembly 3 may be made of two sections which can slide against each other and/or be assembled sliding in relation to the first front sub-assembly 1, so as to adjust the handle to a suitable height for the user thereof and/or to enable the stroller to be folded.

In this first embodiment, the two chassis elements of the stroller, useful for attaching the seat, are on the one hand, the first crossbar 34 connecting the lower parts of the push-pieces, and on the other hand, the second crossbar 15 extending near the front wheels and connecting the two front uprights 11, 12.

The first crossbar 34 can, in particular, be a rounded or curved form, at least one the right and left edges thereof, and formed directly in the extension of the lower parts of the push-pieces. It is provided recessed and above the second crossbar 15.

Figure 8:
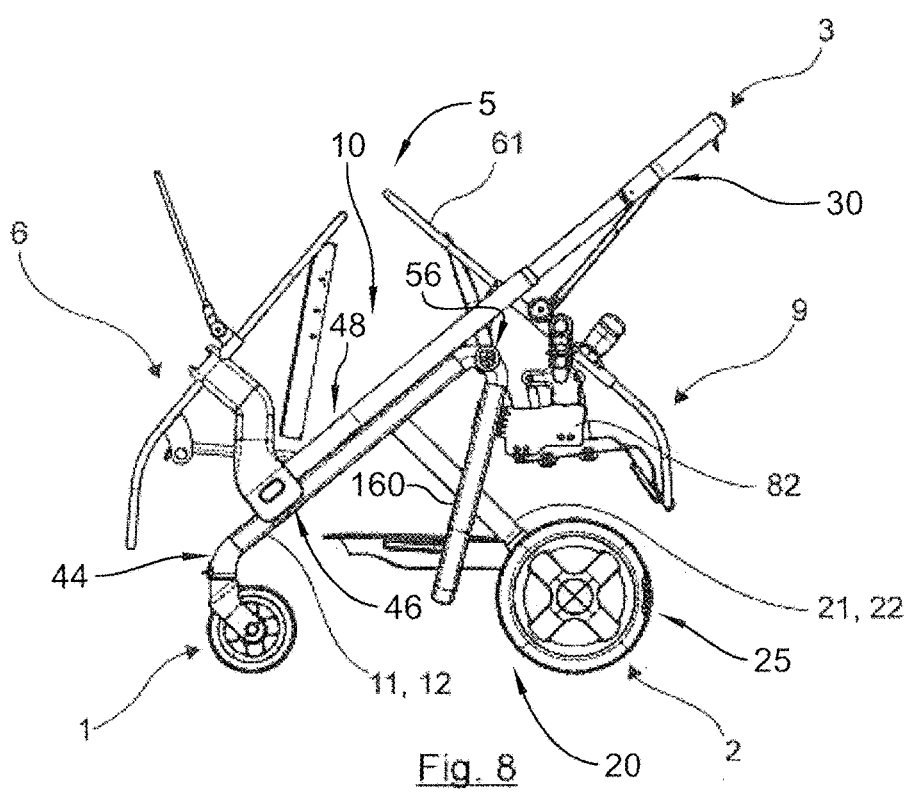
Figure 9:
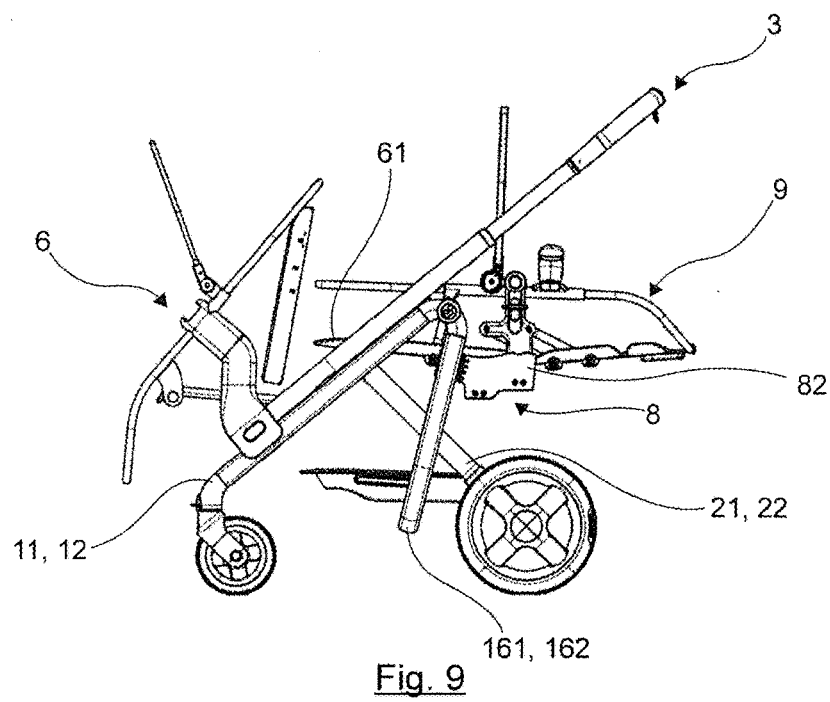
Figure 10:
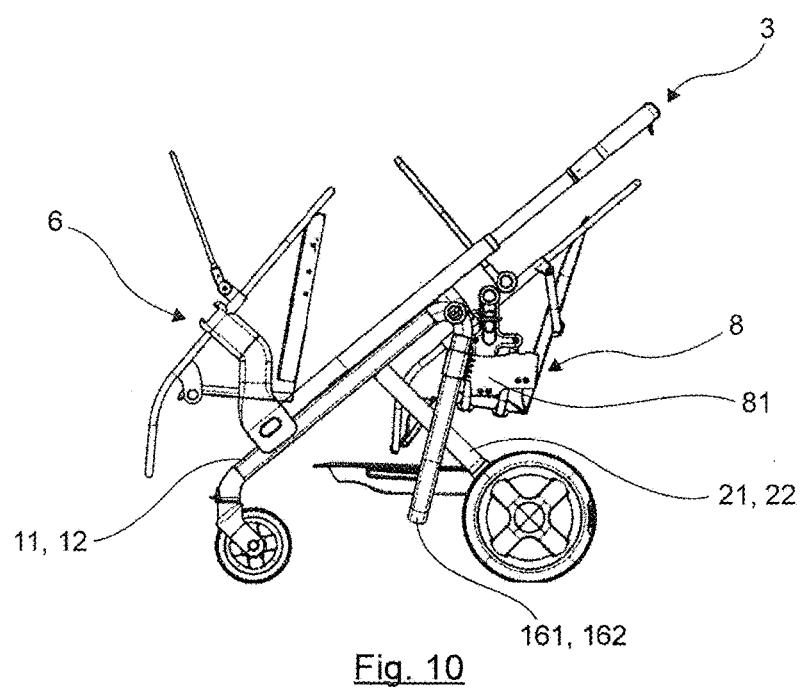

A main seat (also called a carrycot, a shell, or a first seat), as shown for example in FIGS. 8-10, may be used to transport a first child. The main seat is installed on the chassis of the stroller, more specifically on the first front sub-assembly 1, by the intermediary of connecting elements 17 provided for this purpose. Thus, in the embodiment illustrated, the first seat, or main seat, is assembled so that it may be removed, and is almost centred in relation to the chassis.

In this first embodiment, the main seat may also be mounted removably on the chassis by the intermediary of a pair of adapters comprising connecting zones with the seat, offset towards the back of the stroller, for example, according to the approach illustrated in FIGS. 7-10 as described in the second embodiment.

A second seat 4 (also called a booster seat), may be installed removably on the chassis, to receive a second child. It is assembled at the front and at a level lower to that of the main seat. Thus, the main seat and the booster seat 4 are shifted in height in relation to the chassis, which enables to not impede the view of each one of the children and to distribute the weight over the chassis of the stroller.

The booster seat 4 is made of a backrest 41 and a base 42 as shown in FIG. 2. The booster seat 4 includes means for connecting with the chassis of the stroller. The means for connecting includes at least two units for connecting with the first crossbar 34 and the second crossbar 15.

In the example illustrated, the backrest 41 and the base 42 each carry a unit for connecting respectively with the first crossbar 34 and the second crossbar 15.

The connecting elements comprise two rings 4221 and 4231, assembled respectively at the end of two substantially vertical legs 422, 423, themselves extending in the extension of a horizontal rod 424, attached under the base 42 of the booster seat 4 as shown in FIGS. 1 and 2. The rod 424 and the two legs 422, 423 can be formed as a single part, folded adequately.

The rings 4221 and 4231 comprise two sections, a first section attached to the corresponding leg and a mobile section, that can be moved away from the attached section to enable the implementation of the ring and can then be locked onto this attached section of the ring, to close it and to ensure an effective holding on the second crossbar 15, as illustrated in FIG. 1.

The base of the backrest 41 carries a fastening jaw that has two half-jaws 411, 412, able to overlap the first crossbar 34. At least one of these two half-jaws 411, 412, can be deformed, for example, the upper half-jaw 412, to enable a connection and a disconnection by clipping.

In another embodiment, the fastening jaw could be attached to the base, for example, under the base.

Thus, the assembly of the booster seat on the chassis is done first by the implementation of the rings 4221 and 4231, the booster seat being tilted towards the front. Once these rings are locked, the booster seat 4 is pivoted around the second crossbar 15, such that the half-jaws 411, 412, are positioned around the first crossbar 34.

The disassembly of the booster seat is done symmetrically, by pulling on the top of the backrest 41 for example, to unclip the half-jaws 411, 412, and to make the seat tilt towards the front. Then, the rings 4221, 4231 are unlocked, to separate them from the second crossbar 15.

According to a variant, as shown in FIG. 3, each of the legs 422, 423, extending under the base carries an open collar 54, substantially in a horseshoe form, and of which each arm 541, 542 is sufficiently flexible to be moved away when the user positions them above the crossbar 15, then presses on the seat (arrow A), to then keep the collar 54 effectively surrounded around the second crossbar 15.

The base of the backrest 41 carries, a jaw 55, able to surround the first crossbar 34. The jaw 55 comprises an upper, attached half-jaw 551, slightly flexible, moulding the upper part of the first crossbar 34. The lower half-jaw 552 is itself mobile, and/or cooperate with a mobile element 51, enabling to ensure a locking of the booster seat on the chassis, and to enable the unlocking, to remove this booster seat.

In the illustrated embodiment, the element 51 can slide in a substantially horizontal plane, under the base 42. In a locking position, which is the default position, in the absence of other requests, controlled by a spring 53, the element 51 is pushed back towards the back of the stroller, and closes the jaw 55 around the first crossbar 34, that the booster seat 4 is effectively held on the chassis.

The unlocking, enabling the removal of the seat, may be ensured by a trigger 52, positioned under the base 42, and which enables to move the element 51 towards the front of the stroller, by compressing the spring 53. It is thus possible to separate the jaw 55 from the first crossbar 34.

Thus, the installation of the booster seat 4 is simple. The user positions the collar 54 on the second crossbar 15 (arrow A), then tilts the booster seat 4 in rotation, around this second crossbar (arrow B) until the jaw 55 contacts the first crossbar 34. The form of the jaw and/or the part 51 is adapted such that one single press on the backrest leads to the part 51 moving back, the implementation of the jaw 55, then the return of the part 51.

The removal of the booster seat 4 is also easy. All that is needed to be done, is to pull on the trigger 52, then to tilt the booster seat towards the front, and finally, unclip the jaws 55.

A second embodiment of a stroller is shown in FIGS. 4-12C. A booster seat of FIGS. 4-12C is coupled to the chassis by three contact points, on two front uprights and a crossbar of the chassis of the stroller.

Two contact points are created between the seat and two lateral front uprights, and a third contact point is created between the seat and the first crossbar (for example, similar to that of the first embodiment).

The stroller whereon the booster seat 6 is installed according to this second embodiment is similar to the stroller of the first embodiment.

A main seat 9, or a carrycot or a shell, used to transport a first child, may be installed on the chassis of the stroller, more specifically on the first front unit 1, by the intermediary of connecting elements provided for this purpose. These connecting elements can be located substantially at the centre of the chassis (as in the first embodiment) or shifted towards the back, as defined later in relation to FIGS. 7-10.

In this embodiment, the booster seat 6 is installed on the front uprights 11, 12 of the stroller, in other words, the uprights belonging to the front unit 1. The frontal crossbar 15 extends between the wheels is no longer used for attaching the seat.

Figure 4:
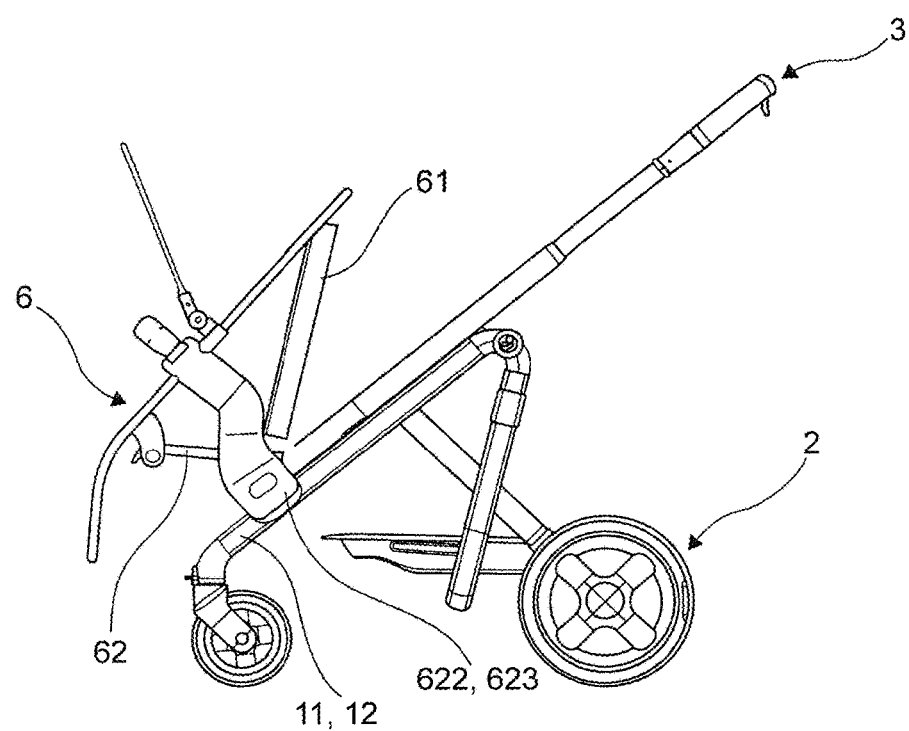

The booster seat 6 is made of a backrest 61 and a base 62, which has means for connecting to the chassis of the stroller as shown in FIG. 4. It also comprises a frame 63, which provides a support for the base, the backrest, the elements for connecting the seat to the stroller, as well as other accessories like a canopy, for example.

The base 62 comprises a first connecting unit made of a fastening jaw 621 that has two half-jaws that are able to overlap the first crossbar 34. Here also, at least one of these two half-jaws may be deformed to enable a connection and a disconnection by clipping.

Figure 6A:
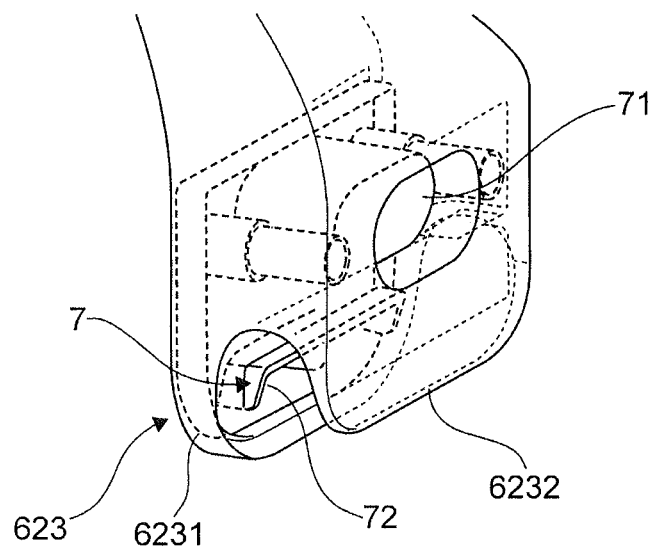
FIG. 6A is partial perspective view with portions shown in phantom of a connecting means included in the booster used to couple to a front upright of the chassis in a locked position in which removal of the booster from the chassis is blocked.
Figure 6B:
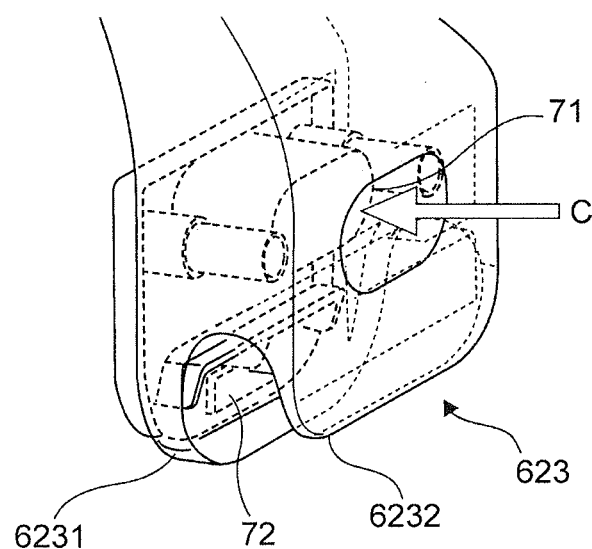
FIG. 6B is a view similar to FIG. 6A showing the connecting means in an unlocked position allowing the booster seat to be separated from the chassis.

It also comprises a second connecting unit, formed of two other fastening jaws 622, 623, as shown in FIGS. 6a and 6B. These jaws 622, 623 are located at the lower end of the lateral uprights of the seat in the figures (traditional positioning for the connecting elements), but can, more generally, be located under the base 62.

It will be noted, that the main axes (in other words, longitudinal) of the jaws 622, 623 and the jaw 621 are perpendicular to each other.

Each one of the jaws comprises two half-jaws 6231, 6232 configured to be embedded around one of the front uprights 11, 12 as shown in FIGS. 6A and 6B.

An internal element 7, assembled so it can slide inside the jaw, enables the locking of the jaw on the upright. It comprises two protruding sections: a first section 71 communicates with the exterior of the upright, so as to be accessible to the user, whereas a second section 72 located between the two half-jaws is configured to enter into contact with the upright.

The jaws are provided to be automatically locked around the uprights 11, 12 as shown in FIG. 6A. In order to unlock them, the user only needs to actuate the protruding section 71, see arrow C in FIG. 6B, forming an unlocking button. The moving forward of the section 71 leads to the section 72 moving back and the release of the corresponding upright.

According to a specific embodiment shown in FIGS. 13-15B, the lateral uprights of the seat which are equipped with fastening jaws 622, 623, are made of two sections articulated against each other.

In particular, the lower section—or foot—6221, 6231 of each lateral upright rotates in relation to the upper section of the upright. This structure enables the feet 6221, 6231 to be folded towards the inside of the seat when it is not used, and when it is removed from the stroller to be stored away.

Figure 14A:
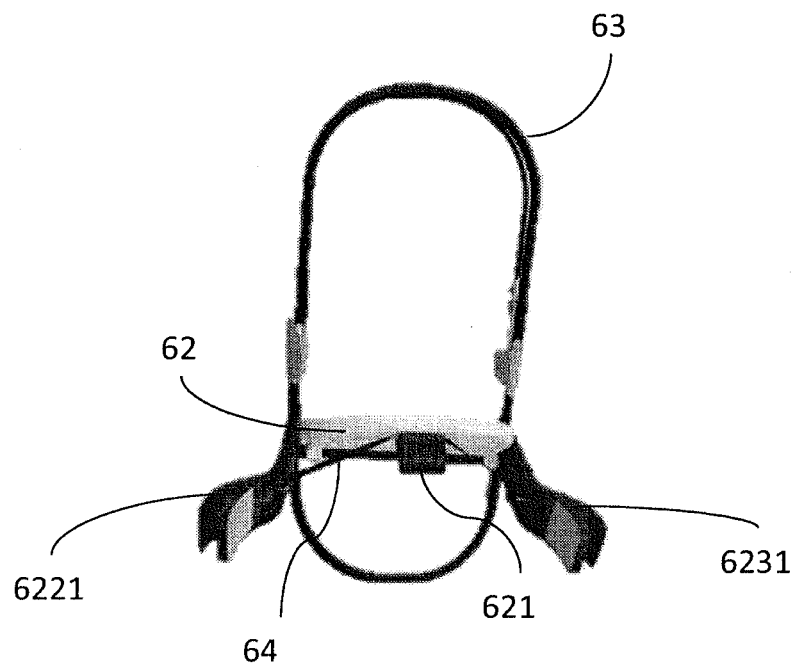
FIG. 14A is a rear perspective view of a booster seat showing fee included in the booster seat being arranged in a use position for connecting the booster seat to the chassis.
Figure 14B:
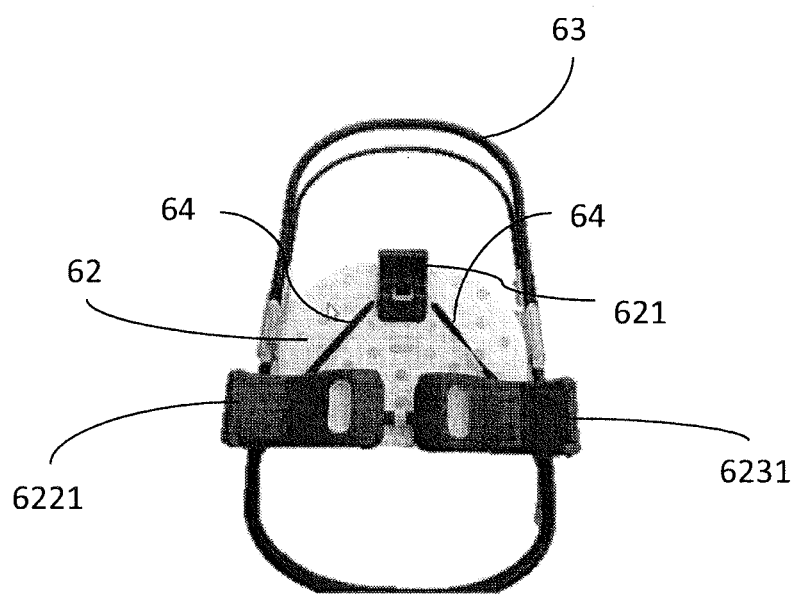
FIG. 14B is a view similar to FIG. 14A showing the feet folded to a storage position for use in storing the booster seat when not used with the chassis.

FIGS. 14A and 14B respectively show the front-view of the seat in a first position, wherein the feet 6221, 6231 are deployed (in other words, in a position of using or connecting to the stroller) and in a second position, wherein the feet 6221, 6231 are folded towards the inside of the seat (in other words, in a folded position, or storage position).

Figure 15A:
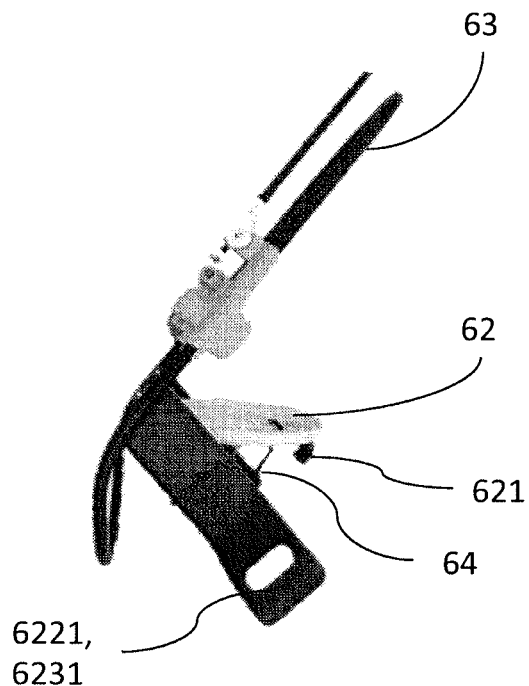
FIG. 15A is side elevation view of the booster of FIG. 14A with the fee in the use position.
Figure 15B:
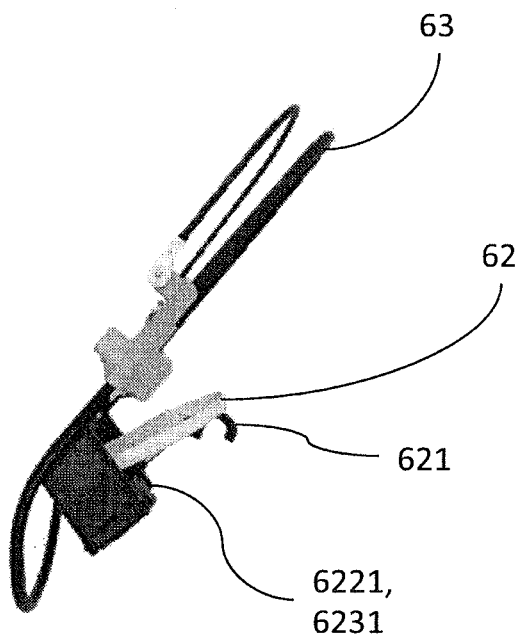
FIG. 15B is a view similar to FIG. 15A showing the feet moved to the storage position.

FIGS. 15A and 15B show the two respective positions, the seat being seen from the side.

When going from the use position to the storage position, the base 62 of the seat changes position: it is folded—at the same time as the feet—towards the frame 63.

More specifically, the feet 6221, 6231 are folded by the user below the base 62 and therefore naturally lead to the latter in their movement.

The base 62 is therefore, in the storage position, substantially parallel to the frame 63 of the seat, which makes the unit compact and enables to store the seat without occupying a significant volume.

When the seat is to be used, it can be provided that the base 62 is deployed at the same time as the feet 6221, 6231 are unfolded.

For this, the feet comprise, for example, means for controlling the movement of the base, in particular comprising one or several straps 64, that can be seen in FIGS. 14A and 14B.

The strap 64 can, on the one hand, be attached by each one of the ends thereof on the interior face of each foot 6221, 6231, and on the other hand, attached in the intermediary part thereof to the base 62, for example, at the level of the central jaw 621.

Alternatively, two straps may be used instead of one single strap, each one connected, for example, on the one hand, to the internal face of a foot, and on the other hand, to the central jaw.

Points for attachment on the feet and on the base, other than those represented, may also be chosen.

Thus, when the user unfolds the feet 6221, 6231, the strap(s) 64 exert(s) a traction on the base 62, rotating it so as to move it away from the frame 63 and make it take a position of use (in other words, substantially perpendicular to the backrest 61).

This simple and effective mechanism enables the user to save time, the user only having to deploy the feet.

In a variant, means implementing small connecting rods or any other means ensuring the movements of the different elements against each other may be considered.

As an example, the assembly of the booster seat 6 on the chassis takes place as follows: the central jaw 621 is first clipped on the crossbar 34, then the two lateral jaws 622, 623 are in turn clipped around the front uprights, via a slight rotation of the seat. The elements of the seat at the end of which the jaws 622, 623 are assembled can be slightly deformable so as to accept a minimum amount of rotation.

The implementation of a booster seat according to the present disclosure is compatible with the presence of a main seat, in particular convertible from a seated position to a laid down position.

In one example, the chassis of the stroller may comprise a pair of rear adapters 8 intended to receive a main child support 9, as shown in FIGS. 7-10, to slightly shift the main child support towards the back, in relation to using without a booster seat.

This pair of adapters 8 comprises, in the embodiment illustrated, two separate adapters which are attached on the uprights 161, 162 articulated in relation to the front uprights 11, 12, such that the rear seat 9 is positioned slightly upstream of the booster seat 6 attached to the front of the stroller.

The pair of adapters 8 thus enables to move the position of the main seat 9 towards the back of the stroller, so as to enable the easy assembly of the two seats 6, 9 and to distribute the load in a balanced way.

Figure 7:
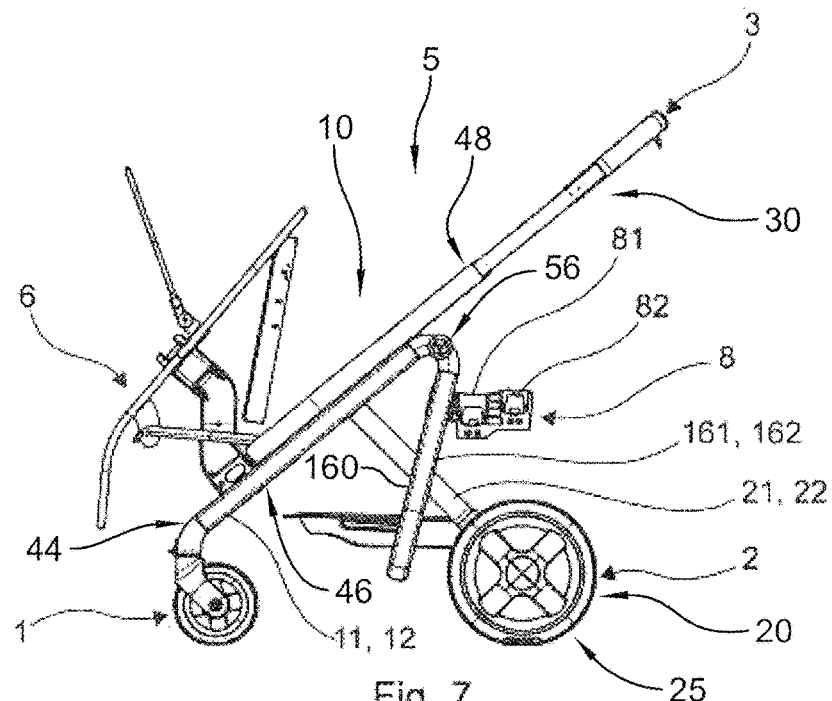

These adapters comprise two positions 81, 82 for connecting with the connecting elements of the seat 9, provided as coded pins as shown in FIG. 7.

These separate positions 81, 82 offer the option to position the main support 9 whether the booster seat is present or not, according to the type of support used and/or according to several configurations, namely, respectively, back to the caregiver (FIG. 10) and facing the caregiver (FIGS. 8 and 9), the latter position needing more space between the two seats 6, 9 because of the length of the backrest 61, in particular when it is tilted, when the seat is in a laid-down position.

The adapters are assembled, for example, by screwing and/or clipping. They may be adapted to adopt two positions: on the one hand, a position of use or carrying position, wherein they are deployed towards the back (as illustrated in FIG. 7) and receive the seat; on the other hand, a storage position, wherein they are folded towards the inside of the chassis and thus do not have a protruding section which may pose a risk to the caregiver or the child.

In this case, they comprise, for example, a hinge, near the uprights, acting as a folding line and from which it is possible to make them do a half-turn. As an addition or in a variant, they can be removable, so as to be able to be removed from the chassis if they are no longer necessary.

FIGS. 11A-11C illustrate a variant of an embodiment of the rear adapters.

Figure 12A:
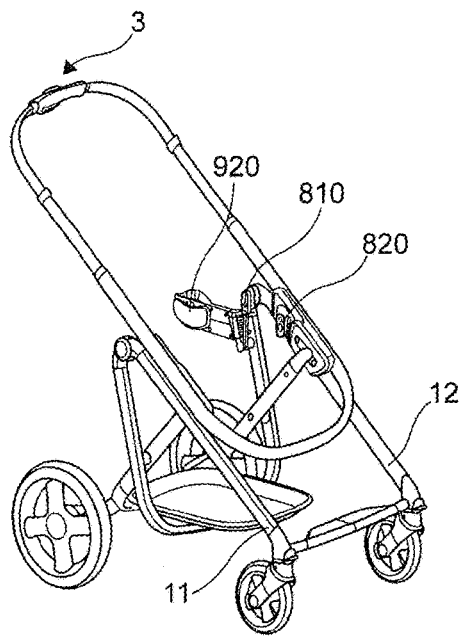
FIG. 12A is a partial perspective view of a stroller in accordance with the present disclosure showing rear means for coupling the first seat to a chassis.
Figure 12B:
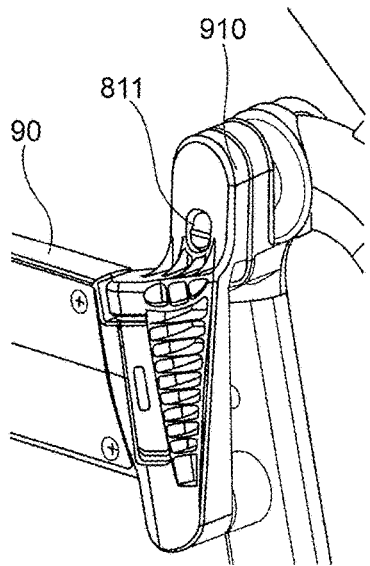
FIG. 12B is an enlarged view of a portion of FIG. 12A showing the rear means coupled to the chassis.
Figure 12C:
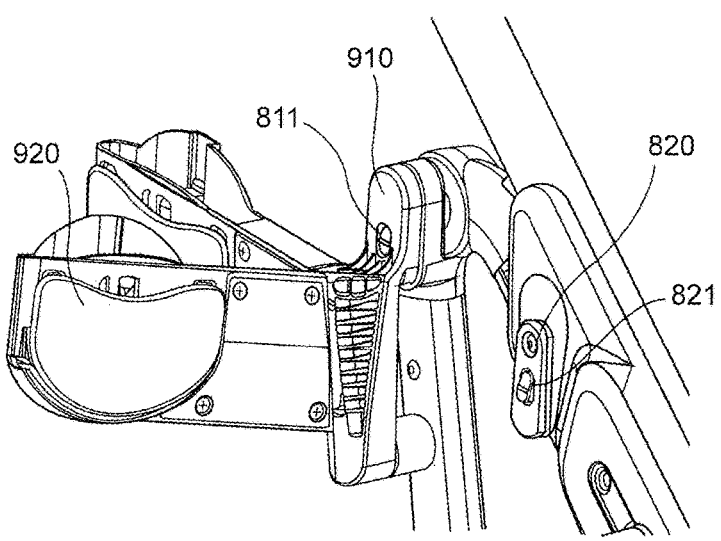
FIG. 12C is an enlarged view of a portion of FIG. 12A showing that the rear means may be arranged in either a first position which extends rearwardly and a second position which extend laterally inward.

The rear adapter system 80 comprises two pairs of male sliders 810, 820, attached to the upper part of the uprights 11, 12 of the stroller, as represented in FIGS. 11C and 12C.

One single slider of each one of the pairs can be seen in the Figs., the other slider being located symmetrically on the front upright, opposite the first slider. Each slider 810, 820 is adapted to cooperate with a female rail 910, formed on the connecting element 90, here of the MODULOCLIP® type, to a corresponding child support (not represented).

An inversion of the male and female parts is also possible, namely that a slider can be formed on the MODULOCLIP® element, so as to cooperate with a rail formed in the front uprights of the stroller. More generally, other attachment methods, as well as other types of connectors, may be implemented.

Each one of the sliders 810, 820 comprises a button 811, 821 which enables the locking in position of the connecting element 90. This button 811, 821 is returned and held in a locking position by a spring (not shown).

The connecting elements 90 may be connected to either of the pairs of sliders 810, 820, in particular according to the present of the booster seat, of the type of child support which is installed, from the orientation thereof (outward-facing, caregiver-facing) and/or the tilt thereof (laid-down, intermediary, seated tilt) as shown in FIG. 11C.

The front sliders 820, arranged substantially at the centre of the stroller, can thus be adapted to receive one single seat (in other words, the stroller does not receive the second booster seat), whatever the orientation and the tilt thereof.

The rear sliders 810, arranged at the back of the sliders 820, may be adapted to receiving a booster seat for use with a second booster seat, arranged at the front of the stroller, conforming with the invention defined in the present document.

The booster seat may be arranged outward-facing (according to a laid-down or intermediary type tilt) or mother-facing (according to a seated type tilt).

FIGS. 12A-12C represent an example of implementing connecting elements 90, here of the MODULOCLIP® type, for rear sliders 810.

These connecting elements 90 comprise, as before, a rail 910 intended to cooperate with the sliders 810 and locked in position by the button 811 and spring system, but the connecting zone 920 is moved once again towards the back of the stroller.

In this configuration, the booster seat connected to the connecting zones 920 can be arranged caregiver-facing (according to a laid-down, intermediary, or seated type tilt) or outward-facing.

A carrycot can also be used instead of the seat.

According to this variant, the connecting elements 90 once implemented on the sliders 810 may be retracted, as illustrated in FIG. 12C.

This enables, in particular, to avoid interference with the pedals for braking/releasing the rear wheels when the chassis of the stroller is folded.

The adapter system 8 such as defined in line with FIGS. 7-10, and the adapter system 80 such as defined in line with FIGS. 11A-11C are compatible with the first embodiment of the present disclosure.

A stroller for children comprises a chassis comprising two front uprights, each one carrying a front wheel or a front wheel unit, two rear uprights, each one carrying a rear wheel or a rear wheel unit, and two push-pieces carrying in their upper part, handles and/or a handlebar, the chassis being able to receive a main child support.

The chassis has a first crossbar extending between the push-pieces, near the lower parts of the push-pieces, and the stroller comprises a removable booster seat equipped with first connecting means cooperating with the first crossbar.

This first crossbar enables a quick, simple, and effective installation of a booster seat.

The removable booster seat comprises second connecting means with a lower section of the chassis, positioned lower than the first crossbar.

The stroller of the present disclosure allows simple assembly of a booster seat on a stroller chassis, by directly using the existing elements of the chassis, namely the first crossbar and a lower section of the chassis. The booster seat may be coupled to the chassis without adding intermediary connecting elements between the chassis and the booster seat or equipping the chassis with specific elements dedicated to receiving the booster seat.

When the booster seat is removed from the chassis of the stroller, this can thus be used without risk to the child or the caregiver as no other elements remain on the chassis for connecting the booster seat to the chassis.

In one example, the second connecting means provide two supporting points for supporting the booster seat on the chassis. These two supporting points provide stability of the booster seat at the level of the lower part of the chassis.

In one example, the chassis has a second crossbar connecting the front uprights near the front wheels, and the second connecting means cooperate with this second crossbar. Using this second crossbar enables to offer an effective base such that the booster seat is supported there.

In one example, the first and/or second connecting means comprise at least one connecting element overlapping at least one of the first and/or second crossbars. Thus, the correct positioning and stability of the booster seat is provided, the connecting elements being at least partially immobilised around the crossbar(s).

In one example, the second connecting means comprise at least one connecting element assembled in the extension of at least one substantially vertical leg extending from the base of the booster seat.

In one example, the second connecting means comprise two connecting elements assembled respectively in the extension of two legs, respectively supporting near the two ends of the second crossbar. The connection at the level of the two ends of the crossbar offers two supporting points relatively distant from each other and thus guarantees a good stability of the booster seat.

In one example, the connecting element(s) enable a rotation of the booster seat in relation to the second crossbar, over a predetermined angular range. Such a rotation enables, in particular, to facilitate the implementation of the booster seat during the installation thereof on the stroller. This can initially be connected to the second crossbar using the second connecting means, then pivoted around this second crossbar, such that the first connecting means cooperate with the first crossbar, to immobilise the seat in position.

In one example, each one of the connecting elements forms a collar that has two flexible arms, which are able to be deviated to be implemented on the second crossbar. This is a simple and effective solution, which minimizes movement of the seat in relation to the second crossbar, at least in a direction perpendicular to the length of the crossbar.

In one example, the supporting points are positioned on each one of the front uprights, the second connecting means comprising a pair of connecting elements overlapping the front uprights of the chassis. This solution is an alternative to using a second crossbar, enabling positioning and the stability of the booster seat, the connecting elements being at least partially immobilised around the uprights.

In one example, the first connecting means have at least one jaw able to surround the first crossbar.

In one example, the jaw extends behind the backrest of the booster seat, substantially in the extension of the base thereof.

In one example, the jaw extends under the level of the base of the booster seat.

In one example, the jaw comprises a stationary upper half-jaw and a lower half-jaw, mobile between a fastening position and a release position. The lower half-jaw can thus be pivoted so as to ensure an immobilisation of the booster seat on the chassis. In an immobilised position, the jaw is closed around the crossbar, in other words, it surrounds the crossbar.

In one example, the lower half-jaw comprises at least one end section moving under the action of a handle assembled under the base. This end section ensures, in particular, by the movement thereof, the pivoting of the lower half-jaw. The action on the handle therefore enables to close or open the jaw, so as to immobilise or release the booster seat.

In one example, the stroller can comprise means for locking the first connecting means with the first crossbar and/or second connecting means with the second crossbar.

In one example, the stroller can comprise means for locking the first connecting means with the first crossbar and/or second connecting means with the at least one of the front uprights.

Thus, the booster seat can be locked in position during the use thereof, so as to avoid any risk of incidents due to an incorrect installation of the seat.

Using second connecting means, in addition to the first connecting means, provides for immobilisation of the seat along three supporting points, which maximizes stability.

In one example, the chassis carries a pair of elements for receiving the main child support, collapsible and/or removable, enabling to shift the position of the main child support towards the back of the chassis when the removable seat is installed on the chassis. These receiving elements thus enable to assemble easily a first main seat, of which the position is shifted towards the back of the stroller, while implementing a booster seat at the front of the stroller. When they are not used, they can be collapsed into a storage position and/or disassembled, such that the stroller chassis has no protruding part, likely to injure the child or the adult and/or interfering with the folding and/or the compactness in the folded position.

In one example, each one of the receiving elements can cooperate with at least two separate connecting positions, corresponding to at least two separate position of the main child support. They enable to choose how to position the main child seat on the chassis, according to several criteria, such as the presence or not of the booster seat, the type of support used and/or the configuration of the seat upon installation (back to the caregiver or facing the caregiver).

In one example, each one of the receiving elements comprises means for connecting to at least one additional element, connected to the front uprights. Thus, the receiving elements are implemented (respectively disassembled) at the level of the front uprights via the cooperation of the connecting means and the additional elements.

In one example, the first connecting means are mobile between a folded position and a deployed position.

In one example, the booster seat comprises two lateral uprights, each comprising a first section connected to the seat and a second section equipped with one of the second connecting means, the second section being articulated in relation to the first section. Thus, it is easy for the user to make the seat go from one position of use, wherein the connecting means are deployed and connected to the stroller, to a storage position, wherein the connecting means are disconnected from the stroller and folded.

In one example, the second sections comprise means for controlling the base of the seat.

In one example, the means for controlling the base comprise at least one strap connected, on the one hand, to the second sections, and on the other hand, to the base. Thus, the movement of the base is connected to the movement of the second sections comprising the connecting means. This is useful during the deployment of the second sections, such that the base is deployed at the same time as the latter. The user therefore has no need to manually deploy the base.

Figure 4A:
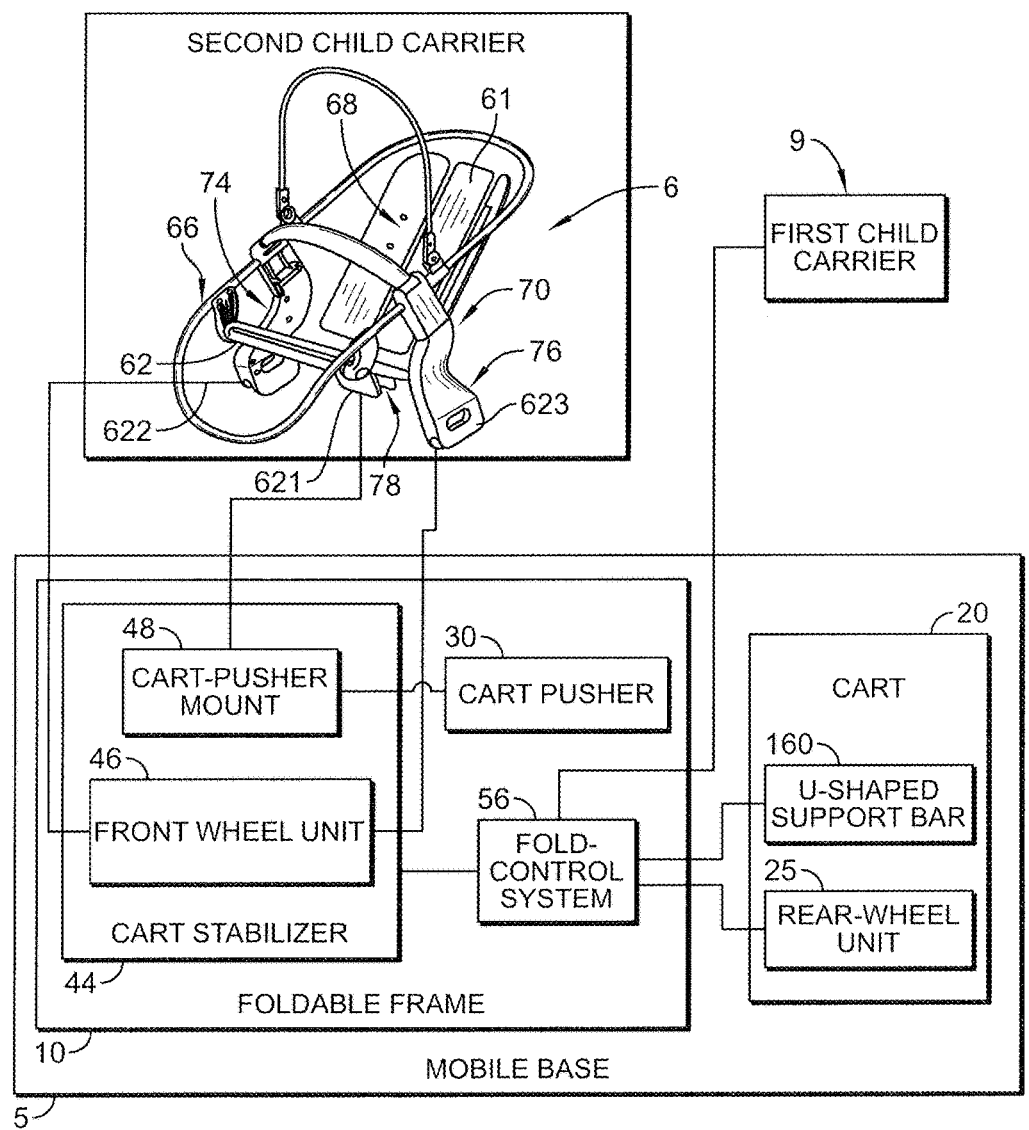
FIG. 4A is a diagrammatic view of a stroller in accordance with the present disclosure showing first and second child carriers are coupled to a mobile base included in the stroller.

A stroller includes a mobile base 5, a first child carrier 9, and a second child carrier 6 as shown in FIGS. 4A and 8. The mobile base 5 is adapted to be pushed by a caregiver at a rear portion of the mobile base 5. The first child carrier 9 is coupled to the mobile base 5 forward of the rear portion of the mobile base 5. The second child carrier 6 is coupled selectively to the mobile base 5 forward of the first child carrier 9 so as to locate the first child carrier 9 between the second child carrier 6 and the rear portion of the mobile base 5.

The mobile base 5 includes a cart 20 and a foldable frame 10 as shown in FIGS. 4A, 7, and 8. The cart 20 is located in spaced-apart relation to the first child carrier 9 and the second child carrier 6. The foldable frame 10 is coupled to the cart 20. The foldable frame 10 is configured to fold between a use position in which the cart 20 has moved away from the foldable frame 10 and a storage position in which the cart 20 has moved toward the foldable frame 10. The second child carrier 6 is coupled to the foldable frame 10.

The cart 20 includes a U-shaped support bar 160 and a rear-wheel unit 25 as shown in FIG. 4A. The U-shaped support bar 160 is coupled to the foldable frame 10. The rear-wheel unit 25 is coupled to the U-shaped support bar 160. The U-shaped support bar 160 may include the U-shaped element 16 made of the two uprights 161, 162. The rear-wheel unit 25 may include the two rear uprights 21, 22 and the two rear wheels 23, 24.

The foldable frame 10 includes a cart pusher 30, a cart stabilizer 44, and a fold-control system 56 as shown in FIGS. 4A, 7, and 8. The cart pusher 30 is adapted to be pushed by the caregiver. The cart stabilizer 44 is configured to move relative to the cart 20 between the use and storage position. The fold-control system 56 is arranged to extend between and interconnect the foldable frame 10 and the cart 20 to control movement of the foldable frame 10 relative to the cart 20 between the use and storage positions.

The cart pusher 30 may include the handlebar 33 and the two lateral uprights (or push-piece arms) 31, 32. The two lateral uprights 31, 32 are received in the cart stabilizer 44 and may be configured to slide selectively relative to the cart stabilizer 44 to adjust a height of handlebar 33 for the user.

The cart stabilizer 44 includes a front wheel unit 46 and a cart-pusher mount 48 as shown in FIG. 4A. The front wheel unit 46 is configured to support the stroller on ground for rolling movement when the foldable frame 10 is in the use position. The cart-pusher mount 48 is coupled to the front wheel unit 46 to slide back and forth relative to the front wheel unit 46 when the foldable frame 10 moves between the use and the storage position.

The front wheel unit 46 may include the two front uprights 11, 12, the two front wheels 13, 14, and the crossbar 15 as shown in FIG. 1. The cart-pusher mount 48 may be formed as a U-shaped member as shown in FIGS. 1 and 11A.

The fold-control system 56 includes a fold unit 84 and a pivot unit 86 as shown in FIGS. 11A-11C. The fold unit 84 is coupled to the cart-pusher mount 48 and the cart 20. The pivot unit 86 is coupled to the front-wheel unit 46 and the U-shaped support bar 160. The pivot unit 86 is configured to provide relative movement selectively between the front-wheel unit 46 and the U-shaped support bar 160.

The second child carrier 6 includes a carrier frame 66, a carrier seat 68, and a carrier mount 70 as shown in FIGS. 4A and 5. The carrier seat 68 is coupled to the carrier frame 66 in a fixed position relative to the carrier frame 66. The carrier seat 68 is adapted to support a child thereon when sitting on the second child carrier 6. The carrier mount 70 is coupled to the carrier frame 66 and arranged to extend between and interconnect selectively the second child carrier 6 to the mobile base 5.

The carrier mount 70 includes a first mount arm 74, a second mount arm 76, and a mount jaw 78 as shown in FIG. 4A. The first mount arm 74 and the second mount arm 76 included in the carrier mount 70 of the second child carrier 6 are coupled to the front wheel unit 46 included in the cart stabilizer 44 of the foldable frame 10. The mount jaw 78 is arranged to extend between and interconnect the carrier frame 66 and the mobile base 5.

The first mount arm 74 is arranged to extend from the carrier frame 66 to the mobile base 5 as shown in FIGS. 4A and 5. The second mount arm 76 is located in spaced-apart lateral relation to the first mount arm 74. The second mount arm 76 is arranged to extend from the carrier frame 66 to the mobile base 5. The first mount arm 74 may include jaw 622. The second mount arm 76 may include jaw 623.

The mount jaw 78 is located in spaced-apart relation between the first mount arm 74 and the second mount arm 76 as shown in FIGS. 4A and 5. The mount jaw 78 is located in spaced-apart longitudinal relation between the first mount arm 74 and the second mount arm 76 and the rear portion of the mobile base 5. The mount jaw 78 included in the carrier mount 70 is coupled to the cart-pusher mount 48 included in the cart stabilizer 44 of the foldable frame 10. The mount jaw 78 may include jaw 621.

The invention claimed is:

1. A stroller comprising
    a chassis comprising two front uprights, each one carrying a front wheel or a front wheel unit, two rear uprights, each one carrying a rear wheel or a rear wheel unit, and two push-pieces carrying in their upper part, handles and/or a handlebar, the chassis being able to receive a main child support,
    wherein the chassis includes a first crossbar extending between the push-pieces near the lower parts of the push-pieces, wherein the stroller further comprises a removable booster seat that includes first connecting means cooperating with the first crossbar,
wherein the removable booster seat comprises second connecting means with a lower section of the chassis, positioned lower than the first crossbar,
wherein the second connecting means provides two supporting points for supporting the booster seat on the chassis, and
wherein the supporting points are positioned on each one of the front uprights, the second connecting means comprising a pair of connecting elements overlapping the front uprights of the chassis.

2. The stroller of claim 1, wherein the chassis includes a second crossbar connecting the front uprights near the front wheels and the second connecting means couples to the second crossbar.

3. The stroller of claim 1, wherein the first connecting means have at least one jaw able to surround the first crossbar.

4. The stroller of claim 1, further comprising means for locking the first connecting means with the first crossbar and/or the second connecting means with the second crossbar.

5. The stroller of claim 1, wherein the first connecting means are movable between a folded position and a deployed position.

6. The stroller of claim 5, wherein the booster seat comprises two lateral uprights each comprising a first section connected to the seat and a second section equipped with one of the second connecting means, the second section being articulated in relation to the first section.

7. The stroller of claim 6, further comprising at least one strap connected, on the one hand, to the second sections, and on the other hand, to the base.

8. The stroller of claim 7, wherein the first connecting means is configured to extend between two push-pieces of the chassis, near the lower parts of the push-pieces.

9. A stroller comprising
a mobile base adapted to be pushed by a caregiver at a rear portion of the mobile base,
a first child carrier coupled to the mobile base forward of the rear portion of the mobile base, and
a second child carrier coupled selectively to the mobile base forward of the first child carrier so as to locate the first child carrier between the second child carrier and the rear portion of the mobile base,
wherein the second child carrier includes a carrier frame, a carrier seat coupled to the carrier frame in a fixed position relative to the carrier frame and adapted to support a child thereon when sitting on the second child carrier, and a carrier mount coupled to the carrier frame and arranged to extend between and interconnect selectively the second child carrier to the mobile base and
wherein the carrier mount includes a first mount arm arranged to extend from the carrier frame to the mobile base, a second mount arm located in spaced-apart lateral relation to the first mount arm and arranged to extend from the carrier frame to the mobile base, and a mount jaw located in spaced-apart relation between the first and second mount arms and arranged to extend between and interconnect the carrier frame and the mobile base.

10. The stroller of claim 9, wherein the mount jaw is located in spaced-apart longitudinal relation between the first and second mount arms and the rear portion of the mobile base.

11. The stroller of claim 10, wherein the mobile base includes a cart located in spaced-apart relation to the first and second child carriers and a foldable frame coupled to the mobile cart and configured to fold between a use position in which the cart has moved away from the foldable frame and a storage position in which the cart has moved toward the foldable frame and the second child carrier is coupled to the foldable frame.

12. The stroller of claim 11, wherein the foldable frame includes a cart pusher adapted to be pushed by the caregiver, a cart stabilizer configured to move relative to the cart between the use and storage position, and a fold-control system arranged to extend between and interconnect the foldable frame and the cart to control movement of the foldable frame relative to the cart between the use and storage positions.

13. The stroller of claim 12, wherein the cart stabilizer includes a front wheel unit configured to support the stroller on ground for rolling movement when the foldable frame is in the use position and a cart-pusher mount coupled to the front wheel unit to slide back and forth relative to the front wheel unit when the foldable frame moves between the use and the storage position.

14. The stroller of claim 13, wherein the first and second mount arms are coupled to the front wheel unit and the mount jaw is coupled to the cart-pusher mount.

15. The stroller of claim 9, wherein the mobile base includes a cart located in spaced-apart relation to the first and second child carriers and a foldable frame coupled to the mobile cart and configured to fold between a use position in which the cart has moved away from the foldable frame and a storage position in which the cart has moved toward the foldable frame and the second child carrier is coupled to the foldable frame.

16. The stroller of claim 15, wherein the foldable frame includes a cart pusher adapted to be pushed by the caregiver, a cart stabilizer configured to move relative to the cart between the use and storage position, and a fold-control system arranged to extend between and interconnect the foldable frame and the cart to control movement of the foldable frame relative to the cart between the use and storage positions.

17. The stroller of claim 16, wherein the cart stabilizer includes a front wheel unit configured to support the stroller on ground for rolling movement when the foldable frame is in the use position and a cart-pusher mount coupled to the front wheel unit to slide back and forth relative to the front wheel unit when the foldable frame moves between the use and the storage position.

18. The stroller of claim 17, wherein the first and second mount arms are coupled to the front wheel unit and the mount jaw is coupled to the cart-pusher mount.

19. The stroller of claim 15, wherein the first and second mount arms and the mount jaw are coupled to the foldable frame.

* * * * *

UNITED STATES PATENT AND TRADEMARK OFFICE
CERTIFICATE OF CORRECTION

PATENT NO. : 10,293,843 B2
APPLICATION NO. : 15/895424
DATED : May 21, 2019
INVENTOR(S) : Naslian et al.

Page 1 of 1

It is certified that error appears in the above-identified patent and that said Letters Patent is hereby corrected as shown below:

On the Title Page

Item (12) "Naslain" should read -- Naslain, et al. --

Item (72) Inventor: ADD: Xavier Lelaure, Thury- Harcourt (FR);

Signed and Sealed this
Thirteenth Day of October, 2020

Andrei Iancu
*Director of the United States Patent and Trademark Office*